United States Patent
Sharma et al.

(10) Patent No.: US 6,631,428 B1
(45) Date of Patent: Oct. 7, 2003

(54) APPARATUS AND METHOD FOR COMPLETING TRANSACTIONS IN ALL FLOW CONTROL CLASSES

(75) Inventors: Debendra Das Sharma, Santa Clara, CA (US); Edward M. Jacobs, Mountain View, CA (US); John A. Wickeraad, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/562,489

(22) Filed: May 1, 2000

(51) Int. Cl.[7] .............................................. G06F 13/00
(52) U.S. Cl. ........................ 710/29; 710/7; 710/20; 710/29; 710/33; 710/36; 710/52; 710/54; 710/55
(58) Field of Search ............................... 710/7, 20, 29, 710/33, 36, 52, 54, 55

(56) References Cited

U.S. PATENT DOCUMENTS

| | | | | |
|---|---|---|---|---|
| 4,084,258 A | * | 4/1978 | Bluethman | 711/110 |
| 5,644,749 A | * | 7/1997 | Obayashi | 711/220 |
| 5,659,794 A | * | 8/1997 | Caldarale et al. | 710/1 |
| 6,167,498 A | * | 12/2000 | Larson et al. | 711/202 |

* cited by examiner

Primary Examiner—Jeffrey Gaffin
Assistant Examiner—Mohammad O. Farooq

(57) ABSTRACT

A mechanism that includes an apparatus and method for ensuring that all transactions within any flow control class completes is herein provided. The mechanism includes a plunge transaction that is inserted in each pending transaction queue and which is transmitted to a particular destination device. All prior transactions in a flow control class are deemed to be complete when the destination device receives the plunge transactions in the flow control class.

18 Claims, 7 Drawing Sheets

APPARATUS AND METHOD FOR COMPLETING TRANSACTIONS IN ALL FLOW CONTROL CLASSES

FIELD OF THE INVENTION

The present invention relates generally to computer systems. More particularly, the invention relates to a mechanism that guarantees completions of transactions in all flow control classes.

BACKGROUND OF THE INVENTION

A current design in most computer systems is to use transactions as a means to communicate between the various devices in the computer system. For example, a processor can initiate a programmed I/O ("PIO") transaction in order to read an I/O device's internal register. A direct memory access ("DMA") read transaction is used by an I/O device to read data from main memory. In order to transmit the transactions to their intended destination in an efficient manner, the transactions are classified in accordance with a flow control class. Transactions that belong to the same flow control class typically share a common FIFO. A transaction is grouped into a particular flow control class in order to ensure that there are no circular dependencies between the classes since a circular dependency may cause a deadlock.

At times, there is a need to take a checkpoint or to shot down an application. In order to perform these tasks, all the outstanding transactions need to complete or arrive at their intended destinations. Often, the application will wait a predetermined amount of time that is intended to be long enough for all the transactions to complete. However, a situation may arise where a transaction takes longer than expected and does not complete before the checkpoint occurs or the application terminates. As such, this method cannot ensure that all transactions have completed. Accordingly, there is a need to overcome this shortcoming.

SUMMARY OF THE INVENTION

In summary, the technology of the present invention pertains to a plunge transaction that allows all flow control class transactions to complete when so requested. A number of transaction completer units are provided in those units that process transaction activity. In an embodiment of the present invention, there is an I/O transaction completer unit, a cache unit transaction completer unit, and an I/O link transaction completer unit. The I/O transaction completer unit handles the flow control class of transactions that interact with I/O devices. The cache unit transaction completer unit handles the flow control class of transactions that are used by the cache unit and those that are transmitted to an external memory controller unit. As such, the I/O transaction and cache unit transaction completer units insert a plunge transaction into their respective outbound transaction queues. The I/O link transaction completer unit is the recipient of the plunge transactions and when it receives a plunge transaction for each flow control class then all the pending transactions have completed.

The cache transaction completer unit has a register that a coordinator processor can write to in order to initiate the plunge process which is in response to a directive from the software. The register has a bit representing each flow control class of transactions and when a particular bit is set, the cache transaction completer unit initiates the requisite activity to insert the appropriate plunge transaction in the transaction queue of the requested flow control class whenever the unit has the opportunity.

The I/O link transaction completer unit receives the plunge transaction and tracks the completion of that particular flow control class of transactions. When the I/O link transaction completer unit receives a plunge transaction for each flow control class then all the pending transactions have completed.

This mechanism does not cause a deadlock since the plunge transaction is inserted into each flow control class and follows the normal flow of a transaction without creating any new dependencies between flow control classes.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
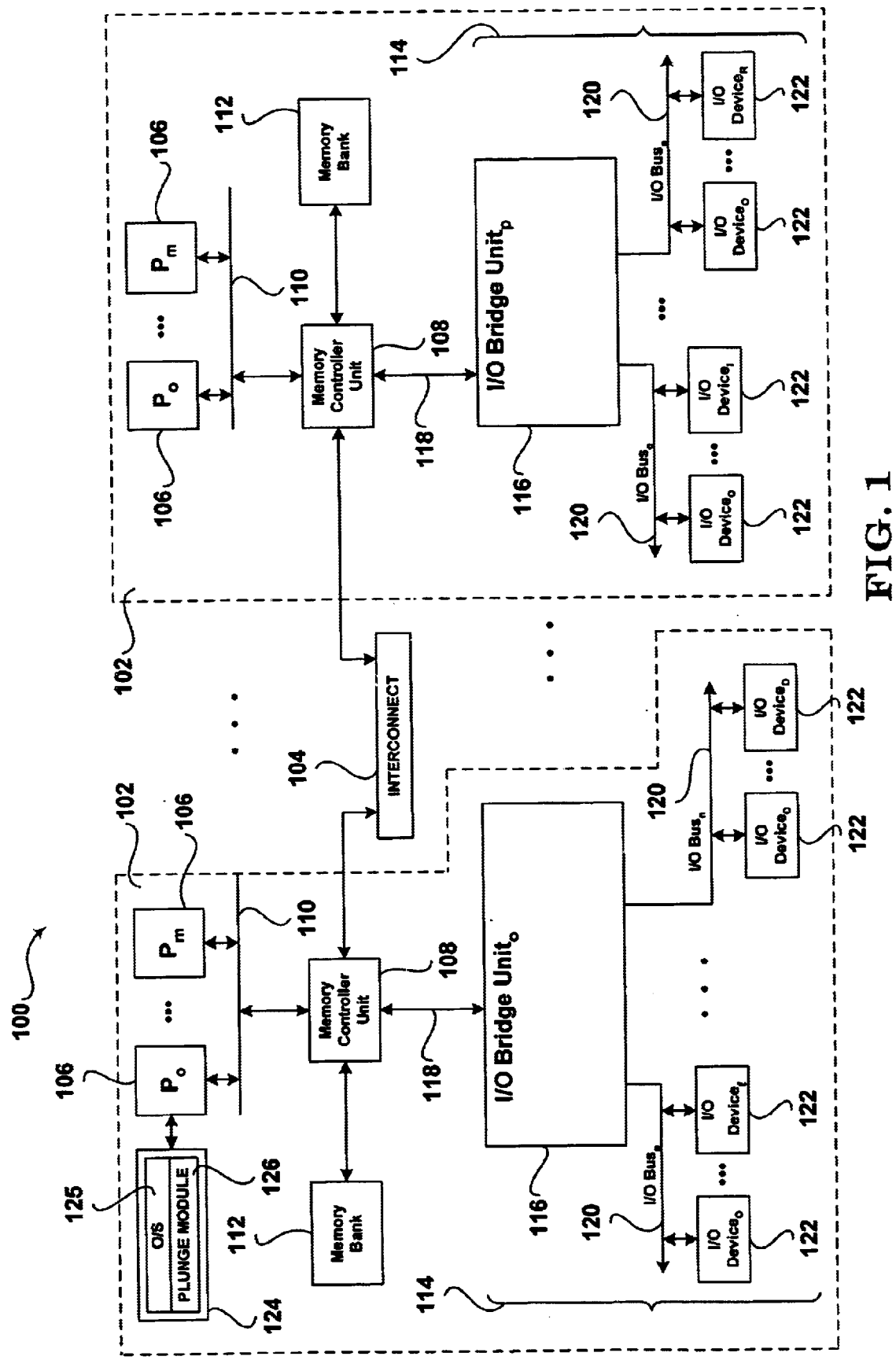
FIG. 1 is a schematic view of an exemplary computer system in accordance with an embodiment of the present invention.

FIG. 1 illustrates an exemplary computer system 100 embodying the technology of the present invention. There is shown a number of cells 102 connected through an interconnect 104. Each cell 102 can include a number of processors (e.g., $P_0$–$P_m$) 106 connected to a memory controller unit 108 by a first communication link 110, such as a bus. The memory controller unit 108 is also connected to a memory bank 112 and an I/O subsystem 114.

The processors 106 can be any type of processor or central processing unit ("CPU"), such as but not limited to, microprocessors and the like. Examples of such microprocessors include the Hewlett-Packard ("HP") PA-RISC family of microprocessors, the Intel IA-32 and IA-64 microprocessors, and the like. Each processor 106 has several levels of internal caches (not shown) that store a portion of the system memory that can be accessed by other processors 106 in the cell 102 and by other cells 102. In addition, each processor 106 has an internal memory 124 that is used to store an operating system 125 or the like, that has a plunge module 126 which will be described in more detail below.

The memory controller unit 108 controls access to the system memory. The memory banks 112 can be composed of any type of memory device or combination thereof, such as DRAM, SRAM, RAM, flash memory, and the like.

Each cell 102 includes a portion of the system memory and the requisite components that maintain the system memory in a coherent manner. The system memory image of the multiprocessor computer system 100 is distributed throughout each cell 102 and can be partitioned to be accessible within each cell 102 and by other cells 102. For example, the system memory can include interleaved memory which is memory that is interleaved across cells 102 or non-interleaved memory which is memory that is accessible within a cell 102.

The interconnect 104 can be any type of high-speed communication link, such as but not limited to, a network, point-to-point link, crossbar switch, or the like. Preferably, a crossbar switch is used.

The I/O subsystem 114 can include an I/O bridge unit 116 connected to a number of I/O devices 122 through an I/O second bus 120, such as the Peripheral Component Interface ("PCI") bus. The I/O devices 122 can include, but are not limited to, host bus adapters, bus bridges, graphics adapter, printers, audio peripherals, motion video peripherals, and the like. The I/O bridge unit 116 is connected through a high-sped interconnect 118 to the memory controller unit 108.

Figure 2:
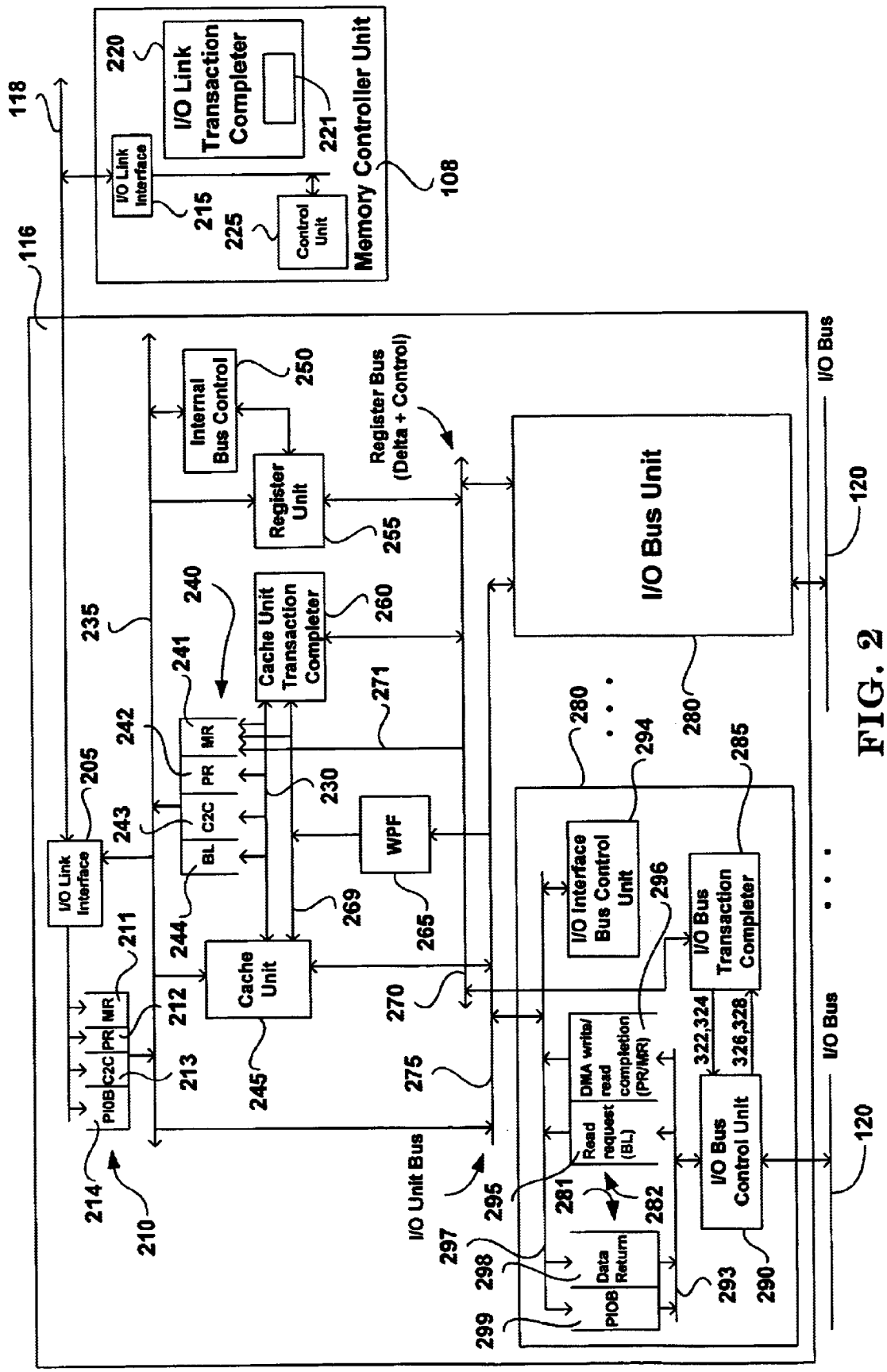
FIG. 2 is a block diagram illustrating the I/O bridge unit and the memory controller unit shown in FIG. 1.

FIG. 2 illustrates the I/O bridge unit 116 and the memory controller unit 108 in further detail. The I/O bridge unit 116 includes an I/O link interface 205 that communicates with the memory controller unit 108 through the interconnect 118. The I/O link interface 205 receives transactions from the memory controller unit 108 which are stored in an inbound transaction queue 210. The inbound transaction queue 210 is connected to an internal bus 235.

The inbound transaction queue 210 includes a separate queue for each of the following flow control classes:

MR, 211—is the flow control class of transactions for all data returned from main memory (e.g., data returned for a read request to the processor 106 by an I/O device 120);

PR, 212—is the flow control class of transactions for all data returns and status returns to the memory controller unit 108 (e.g., giving up ownership of a cacheline);

C2C, 213—is the flow control class of transactions for all cache to cache data transfers; and PIOB, 214—is the flow control class of transactions for all I/O accesses (e.g., read/write of an internal register in the I/O bridge 116 or in the I/O device 120).

A cache unit 245 is provided which serves read requests from the I/O bus units 280 and which maintains data coherency throughout the system 100. There is an outbound transaction queue 240 including a queue for each of the flow control classes: MR, 241; PR, 242; C2C, 243; and BL, 244. A cache unit transaction completer unit 260 is coupled to the cache unit 245 and the outbound transaction queue 240 and is used to coordinate the completion of the flow control class transactions. A write processing FIFO ("WPF") 265 is provided to temporarily store data that is either stored in the cache unit 245 (e.g., DMA write) or in the outbound transaction queue 240 (e.g., read request data returned by the I/O devices 120).

A register unit 255 is coupled to the internal bus 235 and is used to coordinate all accesses to registers inside the I/O bridge unit 116 through register bus 270. For example, if processor 106 reads from a register inside the cache unit transaction completer 260, the read request comes from the PIOB queue 214 to internal bus 235 and is picked up by the register unit 255. Register unit 255 then sends the appropriate command and control sequence to the cache unit transaction completer 260 which results in the unit 260 giving out data on the register bus 270 that the register unit 255 picks up. Later, the register unit 255 coordinates with the internal bus control 250 to put the transaction into the MR queue 241 and then onto the high-speed interconnect 118 and back to the processor 106.

The I/O bridge unit 116 includes a number of I/O bus units 280 that are connected through an I/O unit bus 275. Each I/O bus unit 280 connects to one I/O bus 120 and processes the data received from or transmitted to the I/O devices 122.

Each I/O bus unit 280 includes an outbound transaction queue 281 including a PIOB queue 299 and a data return queue 298 and an inbound transaction queue 282 including a BL queue 295 and a PR/MR queue 296. The inbound and outbound transaction queues 281, 282 are coupled to an I/O interface bus 297 which is connected to the I/O unit bus 275. An I/O bus transaction completer unit 285 is provided that coordinates the completion of the BL and PR/MR flow control transactions in the inbound transaction queue 282. The I/O bus transaction completer unit 285 is coupled to the register bus 270 and to an I/O bus control unit 290. The I/O bus control unit 290 controls the processing of data to and from the I/O bus 120. The I/O bus control unit 290 is coupled to the inbound and outbound queues 281, 282 through internal bus 293. An I/O interface bus control unit 294 is provided that controls access to the I/O interface bus 297.

Each memory controller unit 108 includes an I/O link interface 215, an I/O link transaction completer unit 220, and a control unit 225 representing the rest of the memory controller unit 108. The I/O link interface interfaces with the interconnect 118, the I/O link transaction completer unit 220 ensures that the flow control transactions have completed, and the control unit 225 handles other processing activities within the memory controller unit 108. The I/O transaction completer unit 220 includes a plunge register 221 that has contains a completion field indicator for each flow control class and a source corresponding to each flow control class.

Figure 3:
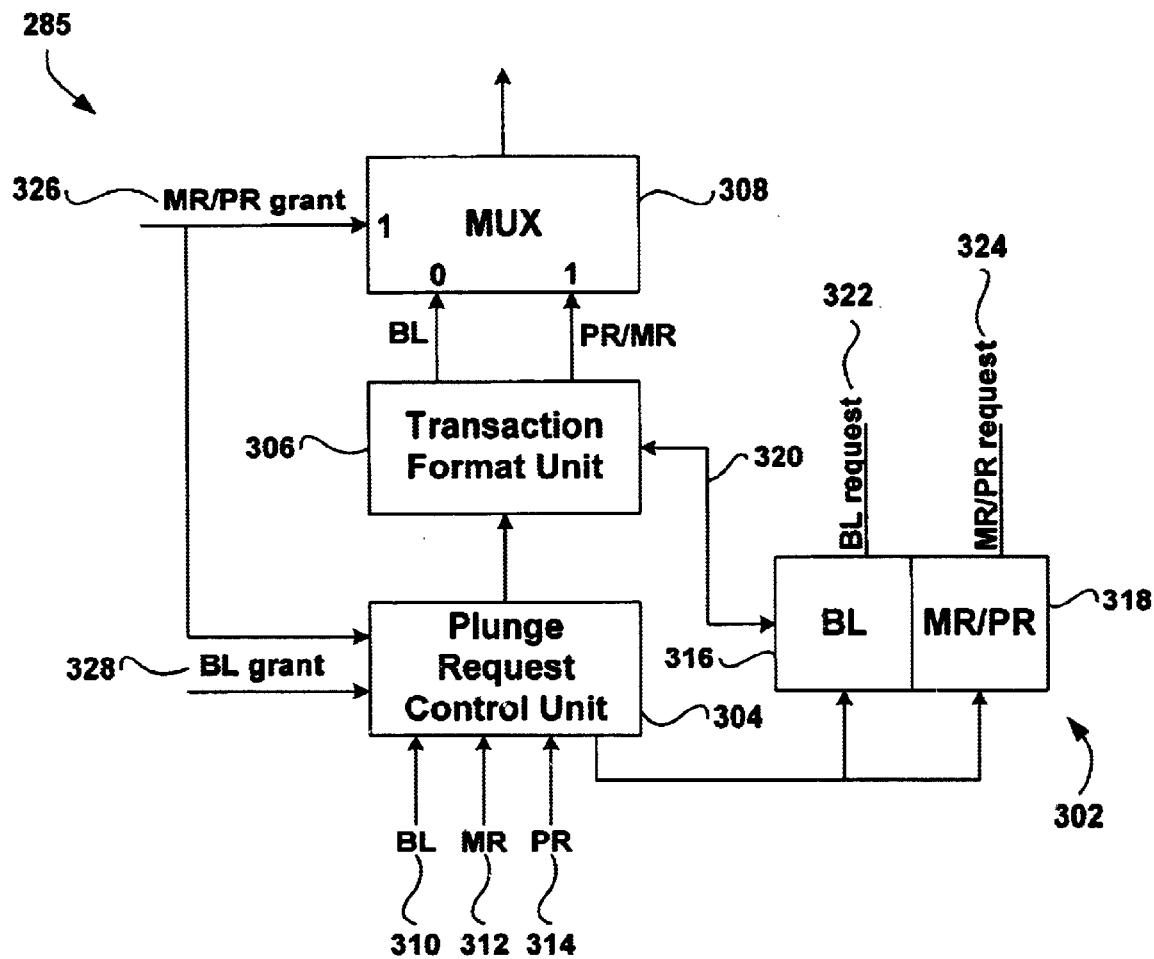
FIG. 3 is a block diagram illustrating the I/O bus transaction completer unit shown in FIG. 2.

Attention now turns to a more detailed discussion of the I/O bus transaction completer unit 285 which is shown in FIG. 3. There is a plunge request register 302, a plunge request control unit 304, a transaction format unit 306, and a multiplexer unit 308. The plunge request control unit 304 receives requests (e.g., BL 310, MR 312, PR 314) through the register bus 270 to initiate a plunge request for one or more of the BL, MR, and PR flow control class transactions. These requests 310, 312, 314 can come from either the cache unit transaction completer 260 or from the register unit 255. In response to a plunge request 310, 312, 314, the plunge request control unit 304 sets the appropriate field in the plunge request register 302. The plunge request register 302 has a BL field 316 that when set indicates that the BL transaction queue 295 is to be plunged and a MR/PR field 318, that when set indicates that the MR/PR transaction queue 296 is to be plunged.

In response to the setting of one or more of the fields 316, 318 in the plunge request register 302, a signal 320 is set to indicate to the transaction format unit 306 that the unit 306 should format the corresponding plunge transaction. In addition, the appropriate request signal is set (i.e., BL request 322, MR/PR request 324) and transmitted to the I/O bus control unit 290. The I/O bus control unit 290 takes notice of the request and when the unit 290 completes its current tasks, the unit 290 processes the requests 322, 324. The I/O bus control unit 290 will set the appropriate grant signal (i.e., MR/PR grant signal 326, BL grant signal 328) that is transmitted back to the plunge request control unit 304.

When the plunge request control unit 304 receives the grant signals 326, 328, the appropriate fields 316, 318 in the plunge request register 302 are cleared and the multiplexer unit 308 is set to select the requested plunge request from the transaction format unit 306. The plunge request is then transmitted to the WPF unit 265.

Figure 4:
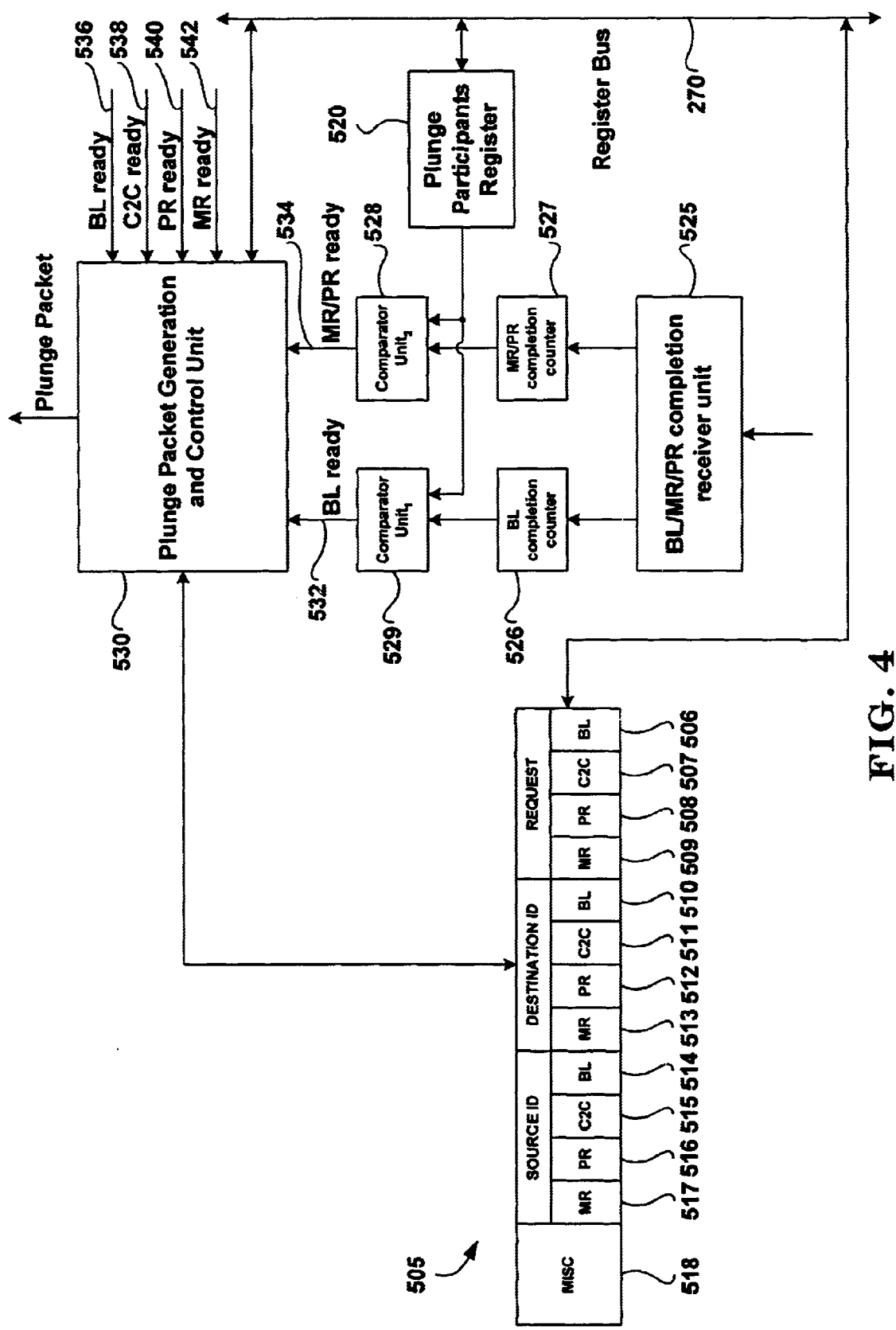
FIG. 4 is a block diagram illustrating the cache unit transaction completer unit shown in FIG. 2.

Attention now turns to a more detailed description of the cache unit transaction completer unit 260 shown in more detail in FIG. 4. There is shown a plunge request register 505, a plunge participants register 520, a BL/MR/PR completion received unit 525, a BL completion counter 526, a MR/PR completion counter 527, a first comparator unit 529, a second comparator unit 528, and a plunge packet generation and control unit 530.

The plunge request register 505 includes a request field for each of the flow control classes (e.g., BL request 506; C2C request 507; PR request 508; MR request 509) in the outgoing side, the destination identifier for each class (e.g., BL 510; C2C 511; PR, 512; MR 513) indicating which node the corresponding plunge transaction needs to be routed to in the system 100, a source identifier for each class (e.g., BL 514; C2C 515; PR 516; MR 517) indicating the source of the plunge transaction, as well as other data 518. When a particular class request field is set, it indicates that a plunge request for the corresponding flow control class has been requested from the device listed in the associated source identifier field and which is intended to be transmitted to the device identified in the corresponding destination identifier field. The plunge request register 505 is accessed under the control of the register unit 255.

A plunge participants register 520 is provided which stores the number of I/O bus units 280 participating in the plunge process. This register 520 is accessed under the control of the register unit 255.

The BL/MR/PR completion receiver unit 525 receives plunge transactions for the BL, MR, and PR flow control classes for each I/O bus unit 280 participating in the plunge process. These plunge transactions are transmitted from either the WPF unit 265 or from the cache unit 245. For each plunge transaction received, the BL/MR/PR completion receiver unit 525 increments the respective counter. There is a BL completion counter 526 that counts the number of BL plunge transactions received and a MR/PR completion counter 527 that counts the number of MR/PR plunge transactions received from the BL/MR/PR completion receiver unit 525.

Each completion counter 526, 527 is coupled to a respective comparator unit 528, 529 that determines when all the plunge transactions for a particular flow control class have been received. The comparator units 528, 529 compares the value of each counter 526, 527 with the number of participating I/O bus units in the plunge participants register 520. When the number of plunge transactions for a particular flow control class is the same as the number of participating I/O bus units, a respective ready signal 532, 534 is set. For the BL flow control class of transactions, a BL ready signal 532 is set and for the MR/PR flow control class of transactions, a MR/PR ready signal 534 is set. Both of these signals 532, 534 are transmitted to the plunge packet generation and control unit 530.

The plunge packet generation and control unit 530 receives the BL ready and MR/PR ready 534 signals in addition to signals from the cache unit 245 indicating that the flow control transactions in the cache unit have completed. The cache unit 245 transmits the following ready signals: BL ready 536; C2C ready 538; PR ready 540; and MR ready 542.

When both BL ready signals 532, 536 are asserted, the plunge packet generation and control unit 530 generates a plunge transaction for the BL flow control class that is placed into the BL outbound transaction queue 244. When the C2C ready signal 538 from the cache unit 245 is asserted, the plunge packet generation and control unit 530 generates a plunge transaction for the C2C flow control class that is placed into the C2C outbound transaction queue 243. Likewise, when the PR ready signal 540 and the MR/PR ready signal 534 are set, a plunge transaction for the PR flow control class is placed into the PR outbound transaction queue 242 and when the MR ready signal 542 and the MR/PR ready signal 534 are set, a plunge transaction for the MR flow control class is placed into the PR outbound transaction queue 242.

When a respective plunge transaction is generated and placed in the appropriate queue, the corresponding request flags 506–509 in the plunge request register 505 are cleared. Once these request flags are cleared, the corresponding completion counters 526, 527 are reset as well.

Figure 5:
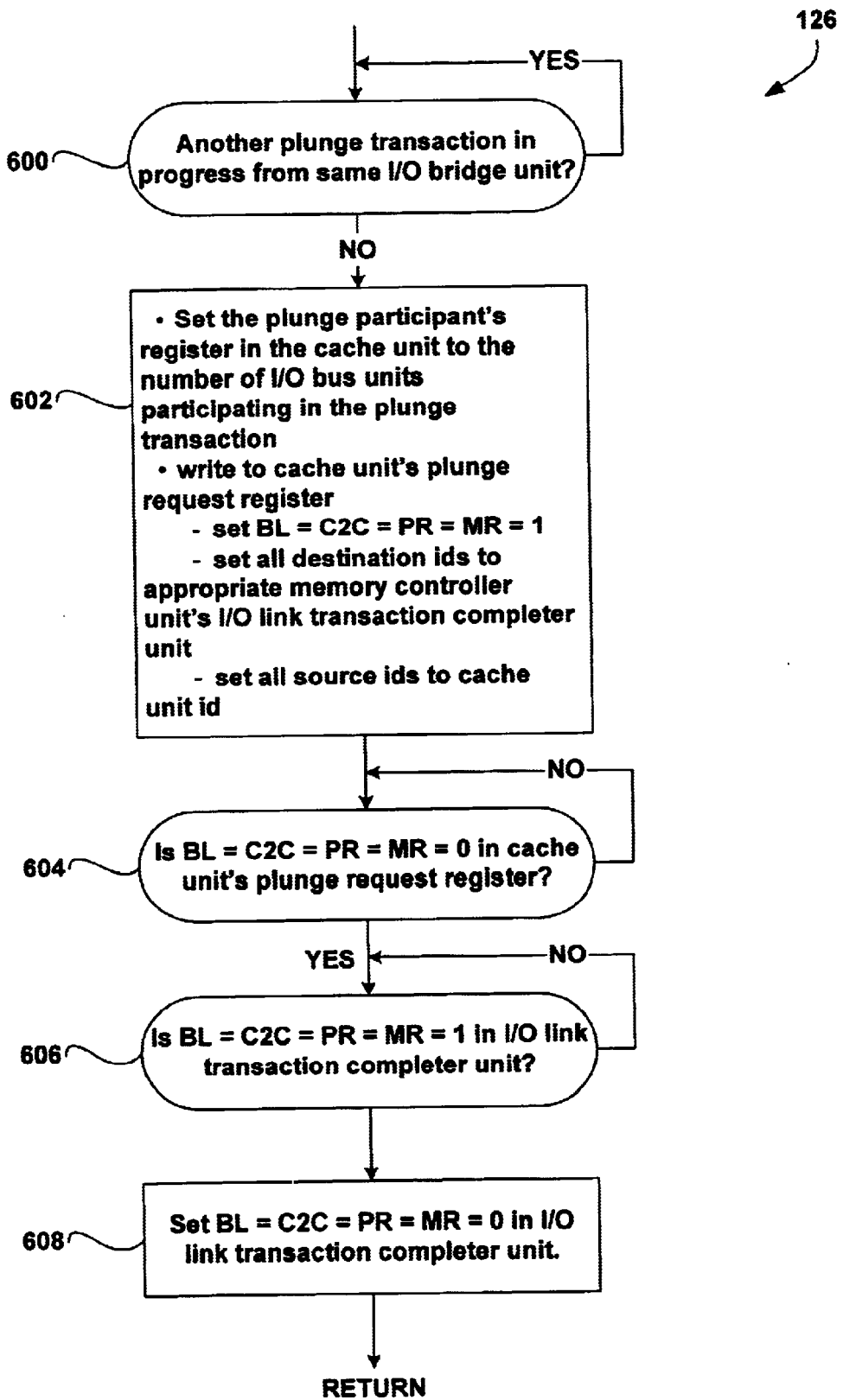
FIG. 5 is a block diagram illustrating the steps used by the plunge module in accordance with an embodiment of the present invention.

Attention now turns to a description of the operation of the plunge mechanism where all the I/O units and the cache together need to send the plunge transaction in each of the flow control classes to the memory controller's I/O link transaction completer 220. Referring to FIG. 5, the software has a plunge module 126 that initiates the plunge process due to a checkpoint activity, a shut down activity, or the like. If an existing plunge activity is in process (step 600-YES), then the plunge module 126 waits until it completes before initiating another plunge process (step 600-NO). It is assumed that the hardware can handle only one plunge sequence at a time in this example, however, this is not considered a limitation on the technology of the present invention.

The plunge module 126 initiates the plunge mechanism by writing to the plunge participant's register 520 with the number of I/O bus units 280 that should participate (step 602). This may be the number of I/O buses, n, that are supported by the I/O bridge unit 116. Next, the plunge module 126 writes into the cache unit's plunge request register 505 setting all the flow control class fields on, setting all the destination identifiers to the memory controller unit's I/O link transaction completer unit, and setting the source identifier fields to the cache unit identifier (step 602).

Next, the plunge module 126 reads the cache unit's plunge request register 505 until all the flow control class fields 506–509 are clear thereby indicating that the plunge transactions have been inserted into the appropriate transaction queues (step 604). The plunge module 126 then reads the flow control class fields in the I/O link transaction completer unit 220 (step 606). If these fields are set, then the plunge transactions have arrived at the intended destination and that all the outstanding transactions have completed (steps 606). In response, the plunge module 126 instructs the I/O link transaction completer unit 220 to clear those fields (step 608).

Figure 6:
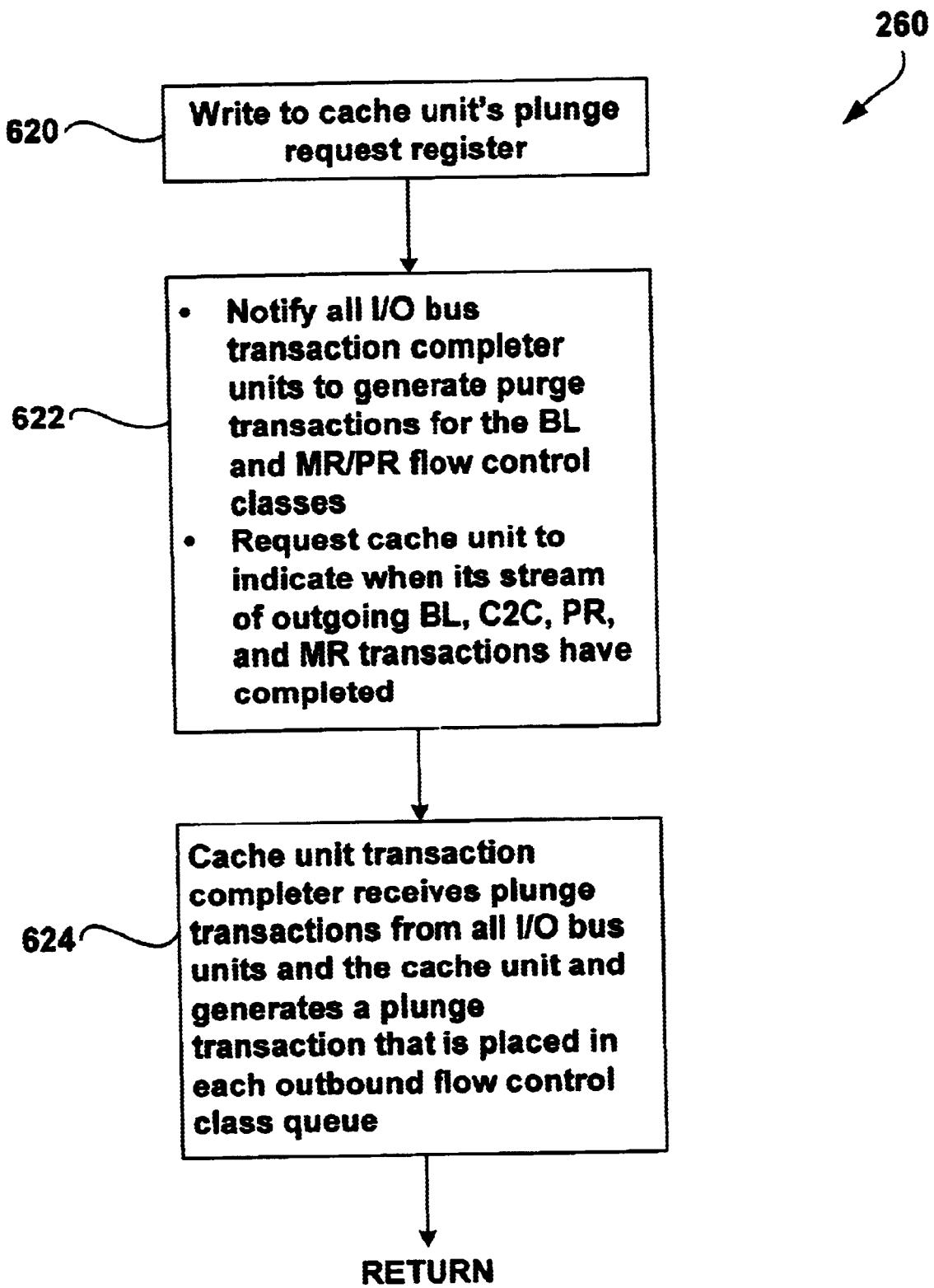
FIG. 6 is a block diagram illustrating the steps used by the cache unit transaction completer unit in accordance with an embodiment of the present invention.

FIG. 6 illustrates the steps that occur once data is written into the cache unit's plunge request register 505. The cache unit transaction completer unit 260 detects that data has been written into the plunge request register 505 (step 620). In turn, the cache unit transaction completion unit 260 then notifies all the I/O bus transaction completer units 285 to generate plunge transactions for the BL and MR/PR flow control classes (step 622). In addition, the cache unit transaction completer unit 260 requests the cache unit 245 to indicate when its stream of outgoing flow control classes have completed (step 622).

The cache unit transaction completer unit 260 then receives plunge transactions for each of the flow control classes from each of the I/O bus units 280 participating in the plunge activity and from the cache unit 245 as described above in FIGS. 3–4 (step 624). Once these plunge transactions are received, the appropriate plunge transactions are generated and placed into the respective outbound flow control class queue 240 which was also described above with respect to FIGS. 3–4 (step 624).

Figure 7:
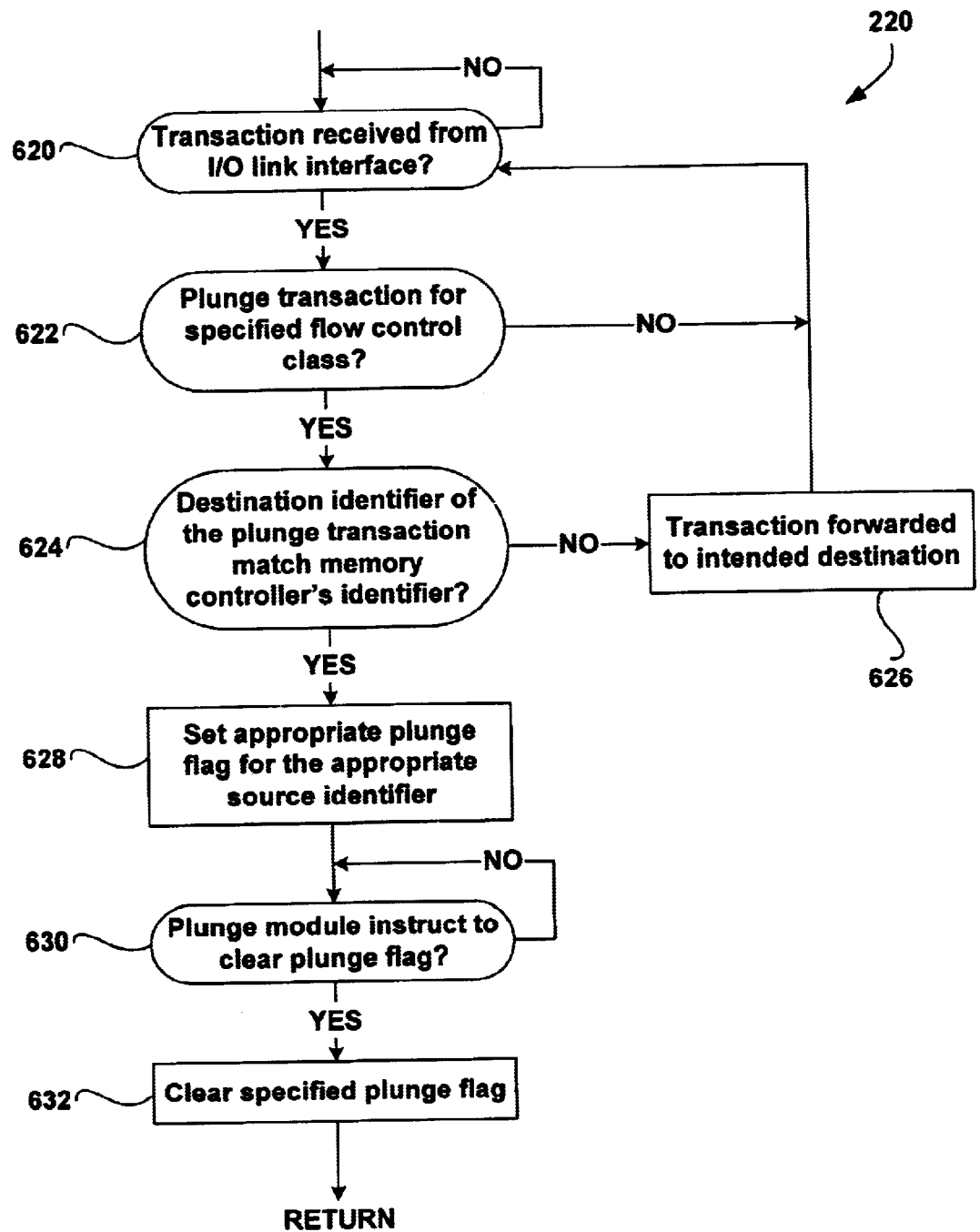
FIG. 7 is a block diagram illustrating the steps used by the I/O link transaction completer unit in accordance with an embodiment of the present invention.

FIG. 7 illustrates the steps taken by the I/O link transaction completer unit 220. The I/O link interface unit 215 receives plunge transactions from the I/O bridge unit 116 as well as other units (step 620). If the I/O link interface unit 215 receives a plunge transaction for a specified flow control class (step 622-YES) which is intended for that particular memory controller unit 108 (step 624-YES), then the I/O link transaction completer unit 220 sets the appropriate plunge flag for the source identifier sending the plunge transaction (step 628). If the I/O link interface 215 receives a plunge transaction intended for another destination (step 626-NO), then the plunge transaction is forwarded to the intended destination (step 626).

The plunge module 126 will then send an instruction to the I/O link transaction completer unit 220 to clear the plunge flag for a particular source identifier (steps 630–632).

The foregoing description, for purposes of explanation, used specific nomenclature to provide a thorough understanding of the invention. However, it will be apparent to one skilled in the art that the specific details are not required in order to practice the invention. In other instances, well known structures and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A computer system, comprising:

a first completion unit including a plurality of outbound queues and a completer unit, each outbound queue having a plurality of transactions, the completer unit generating a plunge transaction into one or more of the outbound queues which is transmitted to an intended destination; and a second completion unit including a plurality of inbound queues and a completer unit, each inbound queue having a plurality of transactions, the completer unit receiving the plunge transaction.

2. A method for detecting completion of transactions within a computer system, the method comprising:

providing a first transaction-completer unit within a first transaction processing component of the computer system that responds to a plunge transaction request by issuing a first plunge transaction;

providing a final transaction-completer unit within a completed transaction receiving component of the computer system that responds to receiving a plunge transaction from the first transaction-completer unit by setting a flag;

issuing a plunge transaction request to the first transaction-completer unit; and determining that the second transaction-completer unit has set the flag to indicate that the plunge transaction has been received from the first transaction-completer unit.

3. The method of claim 2 further including:

providing a second transaction-completer unit within a second transaction processing component of the computer system that responds to a plunge transaction request received from the first transaction-completer unit by issuing a second plunge transaction; and upon receiving a plunge transaction request by the first transaction-completer unit, issuing a plunge transaction request by the first transaction-completer unit to the second transaction-completer unit, and, after receiving a second plunge transaction by the first transaction-completer unit from the second transaction-completer unit, issuing a first plunge transaction by the first transaction-completer unit.

4. The method of claim 2 further including:

providing a third transaction-completer unit within a third transaction processing component of the computer system that responds to a plunge transaction request received from the first transaction-completer unit by issuing a third plunge transaction; and upon receiving a plunge transaction request by the first transaction-completer unit, issuing a plunge transaction request by the first transaction-completer unit to the second transaction-completer unit and issuing a plunge transaction request by the first transaction-completer unit to the third transaction-completer unit, and, after receiving, by the first transaction-completer unit, a second plunge transaction from the second transaction-completer and a third plunge transaction from the third transaction-completer unit, issuing a first plunge transaction by the first transaction-completer unit.

5. The method of claim 4 further including:

partitioning transaction types within the computer system into transaction-type classes;

providing an input and output queue for each transaction-type class in each transaction processing component and in the completed transaction receiving component;

providing within the final transaction-completer unit a flag for each transaction class;

issuing a plunge transaction request for a particular transaction class to the first transaction-completer unit; and determining that the second transaction-completer unit has set the flag for the particular transaction class to indicate that the plunge transaction has been received from the first transaction-completer unit.

6. The method of claim 5 further including:

upon receiving a plunge transaction request for a transaction class by the first transaction-completer unit, issuing plunge transactions for the transaction class by the first transaction-completer unit to the second and third transaction-completer units; and upon receiving, by the first transaction-completer unit, a second plunge transaction for the transaction class from the second transaction-completer unit and a third plunge transaction for the transaction class from the third transaction-completer unit, issuing a first plunge transaction for the transaction class by the first transaction-completer unit.

7. The method of claim 5 wherein the first transaction-completer unit is included within a cache unit of an I/O bridge, the second and third transaction-completer units are included within I/O bus units of an I/O bridge, and the final transaction-completer unit is included within a memory controller unit.

8. The method of claim 1 wherein the first transaction-completer unit is included within a cache unit of an I/O bridge and the final transaction-completer unit is included within a memory controller unit.

9. A transaction completion mechanism within a computer system having a first-level transaction processing component, a number of second-level transaction processing components, and a completed transaction receiving component, each transaction processing component associated with input and output queues, each queue associated with a transaction class, the transaction completion mechanism comprising:

a first-level transaction-completer unit in the first-level transaction processing component that receives a plunge transaction request for a transaction class and issues a plunge transaction for the transaction class to the completed transaction receiving component;

second-level transaction-completer units in the second-level transaction processing components that receive plunge transaction requests for the transaction class from the first-level transaction-completer unit and that issue plunge transactions for the transaction class to the first-level transaction-completer unit; and a final transaction-completer unit in the completed transaction receiving component that, upon receiving a plunge transaction for the transaction class from the first-level transaction processing component, sets a flag for the transaction class.

10. The transaction completion mechanism of claim 9 wherein the first-level transaction-completer unit in the first-level transaction processing component, upon receiving a plunge transaction request for the transaction class, issues a plunge transaction request for the transaction class to the second-level transaction-completer units, and waits to receive plunge transactions from the second-level transaction-completer units for the transaction class before issuing a plunge transaction to the completed transaction receiving component.

11. The transaction completion mechanism of claim 9 further including a plunge module executed by a processor that issues a plunge transaction request for a number of transaction classes to the first-level transaction-completer unit and waits to detect setting of flags for the number of transaction classes by the final transaction-completer unit.

12. The transaction completion mechanism of claim 9 wherein the first-level transaction-completer unit is included within a cache unit of an I/O bridge, the second-level transaction-completer units are each included within an I/O bus unit of an I/O bridge, and the final transaction-completer unit is included within a memory controller unit.

13. A transaction-completer unit included in a transaction-processing component within a computer system in which transaction types are partitioned into transaction-type classes, the transaction-completer unit comprising:

a plunge request register that includes a field for each transaction-type class processed by the transaction-processing component that can be set to request a plunge transaction for the corresponding transaction-type class; and a plunge transaction generator that outputs a plunge transaction for a transaction-type class for which the corresponding plunge-request-register field is set.

14. The transaction-completer unit of claim 13 included within a cache unit of an I/O bridge.

15. The transaction-completer unit of claim 13 included within an I/O bus unit of an I/O bridge.

16. The transaction-completer unit of claim 13 further including a plunge-participants register that can be set to indicate a number of second-level transaction-completer units to which to send transaction requests and from which to receive transaction requests before outputting a plunge transaction.

17. A transaction-completer unit included in a completed transaction receiving component within a computer system in which transaction types are partitioned into transaction-type classes, the transaction-completer unit comprising:

a means for receiving plunge transactions for particular transaction classes from other transaction-completer units; and a set of flags, each flag corresponding to a different transaction class and set by the transaction-completer unit upon receiving a plunge transaction for the transaction class.

18. The transaction-completer unit of claim 17 included within a memory controller unit.

* * * * *